US009308488B1

(12) United States Patent
Liskey et al.

(10) Patent No.: US 9,308,488 B1
(45) Date of Patent: Apr. 12, 2016

(54) HIGH PERMEABILITY POLYIMIDE MEMBRANES: GAS SELECTIVITY ENHANCEMENT THROUGH UV TREATMENT

(71) Applicant: UOP LLC, Des Plaines, IL (US)

(72) Inventors: Carl W. Liskey, Chicago, IL (US); Chunqing Liu, Arlington Heights, IL (US); Michael B. Hamoy, Crystal Lake, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 14/497,353

(22) Filed: Sep. 26, 2014

(51) Int. Cl.
*B01D 53/22* (2006.01)
*B01D 71/64* (2006.01)
*B01D 71/56* (2006.01)
*B01D 69/12* (2006.01)

(52) U.S. Cl.
CPC ............ *B01D 53/228* (2013.01); *B01D 69/125* (2013.01); *B01D 71/56* (2013.01)

(58) Field of Classification Search
CPC .... B01D 53/228; B01D 63/00; B01D 69/125; B01D 71/56; B01D 71/64; C08G 73/1067
USPC ......................................... 95/45, 51; 96/4, 14
See application file for complete search history.

(56) References Cited

U.S. PATENT DOCUMENTS

| | | | |
|---|---|---|---|
| 4,705,540 A * | 11/1987 | Hayes | B01D 71/64 95/51 |
| 4,717,393 A | 1/1988 | Hayes | |
| 5,085,676 A * | 2/1992 | Ekiner | B01D 69/08 96/13 |
| 5,112,941 A * | 5/1992 | Kasai | B01D 71/64 95/55 |
| 5,409,524 A | 4/1995 | Jensvold et al. | |
| 7,198,870 B2 | 4/2007 | Wensley et al. | |
| 7,485,173 B1 | 2/2009 | Liu et al. | |
| 8,613,362 B2 | 12/2013 | Liu et al. | |
| 2003/0070545 A1* | 4/2003 | Liu | B01D 53/228 95/45 |
| 2011/0290112 A1* | 12/2011 | Liu | B01D 53/228 95/54 |
| 2014/0144324 A1* | 5/2014 | Yamanaka | B01D 53/228 96/14 |
| 2015/0140442 A1* | 5/2015 | Cyman, Jr. | C08J 133/14 429/317 |

FOREIGN PATENT DOCUMENTS

WO   WO 2012/171143 A1 * 12/2012 ........... B01D 53/228

OTHER PUBLICATIONS

U.S. Appl. No. 14/497,354, filed Sep. 26, 2014.

* cited by examiner

Primary Examiner — Jason M Greene

(57) ABSTRACT

Polyimide membranes are provided that provide extremely high permeability. The polyimides do not contain carbonyl or sulfonyl functional groups. These membranes are useful in separating gases including the separation of gas pairs including carbon dioxide/methane, hydrogen/methane and propylene/propane as well as other gas mixtures. The membrane selectivity can be adjusted by exposure to ultraviolet light.

9 Claims, No Drawings

HIGH PERMEABILITY POLYIMIDE MEMBRANES: GAS SELECTIVITY ENHANCEMENT THROUGH UV TREATMENT

BACKGROUND OF THE INVENTION

The membranes most commonly used in commercial gas separation applications are asymmetric polymeric membranes and have a thin nonporous selective skin layer that performs the separation. Separation is based on a solution-diffusion mechanism. This mechanism involves molecular-scale interactions of the permeating gas with the membrane polymer. According to this solution/diffusion model, the membrane performance in separating a given pair of gases is determined by two parameters: the permeability coefficient ($P_A$) and the selectivity ($\alpha_{A/B}$). The $P_A$ is the product of the gas flux and the selective skin layer thickness of the membrane, divided by the pressure difference across the membrane. The $\alpha_{A/B}$ is the ratio of the permeability coefficients of the two gases ($\alpha_{A/B}=P_A/P_B$) where $P_A$ is the permeability of the more permeable gas and $P_B$ is the permeability of the less permeable gas. Gases can have high permeability coefficients because of a high solubility coefficient, a high diffusion coefficient, or because both coefficients are high. In general, the diffusion coefficient decreases while the solubility coefficient increases with an increase in the molecular size of the gas. In high performance polymer membranes, both high permeability and selectivity are desirable because higher permeability decreases the size of the membrane area required to treat a given volume of gas, thereby decreasing capital cost of membrane units, and because higher selectivity results in a higher purity product gas. These new membranes have high permeability and the selectivity of some of these membranes can be tuned via cross-linking in the presence of UV light.

SUMMARY OF THE INVENTION

The invention provides a polyimide polymer and a polyimide membrane having a formula

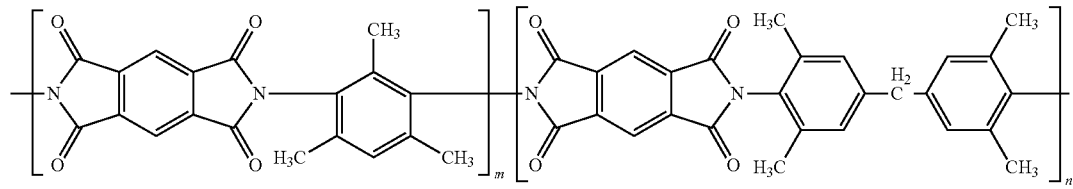

where m and n are independent integers from 10 to 500 and are in a ratio from 1:10 to 10:1

In some embodiments of the invention, this polyimide membrane is UV treated.

The invention further provides a process for separating at least one gas from a mixture of gases comprising providing a UV treated polyimide polymer membrane having a formula

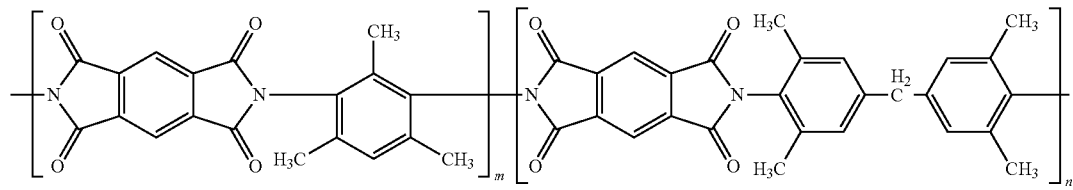

where m and n are independent integers from 10 to 500 and are in a ratio from 1:10 to 10:1; contacting the mixture of gases to one side of the UV treated aromatic polyimide membrane to cause at least one gas to permeate said membrane; and removing from an opposite side of the polyimide membrane a permeate gas composition comprising a portion of said at least one gas that permeated said membrane.

DETAILED DESCRIPTION OF THE INVENTION

This invention relates to polyimide gas separation membranes and more particularly to a new class of polyimide membranes with high permeability. Specifically, an improved polyimide membrane with more than 430 Barrer $CO_2$ and $H_2$ permeabilities greatly exceeding the intrinsic permeability of commercial polyimide membranes is disclosed. The permeability is similar to heat-treated polyimides disclosed in U.S. Pat. No. 8,613,362 B2. However, in this case heat treatment, which can be problematic in the preparation of membranes, is not required to achieve such high permeabilities.

Although the selectivity for gas separations is low with these highly permeable polyimides described in the present invention, it can be increased significantly with UV treatment. In fact, both high permeability and selectivity can be achieved for $CO_2/CH_4$ separation with UV treatment, as demonstrated by pure gas tests for membrane dense films of these polyimides. This sensitivity to UV light is also present in thin-film composite membranes where the disclosed polyimide is the selective layer. U.S. Pat. No. 4,717,393 by Hayes and U.S. Pat. No. 7,485,173 by Liu, et. al., disclosed photochemically cross-linked aromatic polyimides. In these cases, a functional group that is cross-linkable to UV light is required, such as a carbonyl or sulfonyl group. However, the high permeability polyimides described in the present invention do not comprise functional groups that are cross-linkable to UV light.

The polyimides disclosed in the present invention do not contain these carbonyl or sulfonyl functional groups. U.S.

Pat. No. 5,409,524 reported a method for the improvement in selectivity of polymeric membranes, such as polysulfone, polycarbonate and polystyrene membranes, without carbonyl or sulfonyl groups through UV treatment, but heating the membranes to a temperature in the range of 60-300° C. is required. Furthermore, the UV and heat treatment of polyimides were not disclosed in this patent. However, heating is not required during the UV treatment to achieve high selectivity for the polyimides described in the present invention. US 2006/0177740 A1 disclosed a polymer derived from pyromellitic dianhydride (PMDA) and 3,3',5,5'-tetramethyl-4,4'-methylene dianiline (TMMDA) monomers. This disclosure did not include polymers containing 2,4,6-trimethyl-mphenylenediamine (TMPDA). Also, this polymer was used for polyimide matrix electrolytes for battery applications and was not considered for use as a polymeric membrane.

The membranes made in accordance with the present invention have the formula shown below.

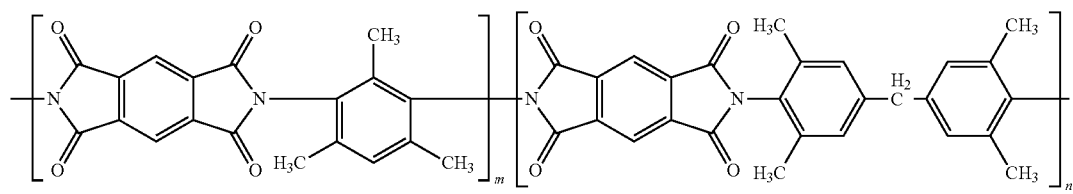

where m and n are independent integers from 10 to 500 and are in a ratio from 1:10 to 10:1.

The invention involves the condensation reaction of pyrometallic dianhydride (PMDA) with a mixture of 2,4,6-trimethyl-1,3-phenylenediamine (TMPDA) and 4,4'-methylene bis(2,6-dimethylaniline) (TMMDA) in a polar solvent such as dimethylacetamide (DMAc) or (NMP) solvent to form the polyimide described in the present invention. The condensation reaction described in the current invention is a two-step process involving the formation of the poly(amic acid) followed by a solution chemical imidization process. Acetic anhydride is used as the dehydrating agent and pyridine is used as the imidization catalyst for the solution chemical imidization reaction. Typical reaction times are about 20 hours at about 22° C. In a second step, acetic anhydride is added, followed by pyridine and the mixture is heated to about 95° C. for 2 hours and then allowed to cool to room temperature. The resulting mixture is then used to make a polyimide membrane which is then treated with UV radiation to produce a polyimide membrane with improved properties.

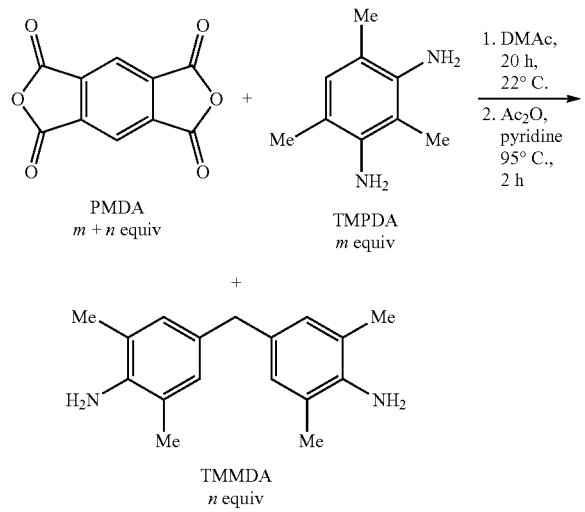

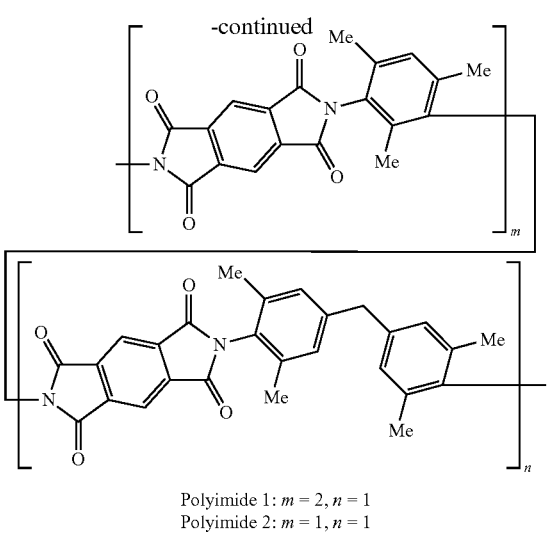

Polyimide 1: $m = 2, n = 1$
Polyimide 2: $m = 1, n = 1$

Example 1

Synthesis of Polyimide 1:
Poly(PMDA-TMPDA-TMMDA) (m=2, n=1)

An aromatic poly(pyrometallic dianhydride-2,4,6-trimethyl-1,3-phenylenediamine-4,4'-methylene bis(2,6-dimethylaniline)) polyimide (poly(PMDA-TMPDA-TMMDA)) was synthesized from pyromellitic dianhydride (PMDA, 3 equiv), 2,4,6-trimethyl-1,3-phenylenediamine (TMPDA, 2 equiv), and 4,4'-methylene bis(2,6-dimethylaniline) (TMMDA, 1 equiv) in N,N-dimethylacetamide (DMAc) polar solvent by a two-step process involving the formation of a polyamic acid followed by a solution chemical imidization process. Acetic acid was used as the dehydrating reagent and pyridine was used as the imidization catalyst for the solution chemical imidization reaction.

For example, a dry 2 L three-necked round-bottom flask attached to a mechanical stirrer and a reflux condenser with a nitrogen inlet was charged with TMPDA (17.0 g, 2.00 equiv), TMMDA (20.0 g, 1.00 equiv), and anhydrous DMAc (380 g) and the solution was vigorously stirred. The dianhydride, PMDA (44.9 g, 3.00 equiv), was added. Additional DMAc (130 g) was added slowly. The reaction vessel was sealed with a septum and stirred at 22° C. for 20 hours. Acetic anhydride (43.2 g) was added to the viscous reaction mixture slowly over 5 minutes, followed by pyridine (66.5 g) all at once. The reaction is heated to 95° C. for 2.5 hours and then allowed to cool to room temperature. The reaction mixture precipitated into a solution of isopropanol:acetone (1:1) to form white thin fibers. The white solid was heated in the vacuum oven for two days at 100° C. The polymer was isolated in nearly quantitative yield.

Example 2

Synthesis of Polyimide 2: Poly(PMDA-TMPDA-TMMDA) (m=1, n=1)

An aromatic poly(pyrometallic dianhydride-2,4,6-trimethyl-1,3-phenylenediamine-4,4'-methylene bis(2,6-dimethylaniline)) polyimide (poly(PMDA-TMPDA-TMMDA)) was synthesized from PMDA (2 equiv), TMPDA (1 equiv), and TMMDA (1 equiv) in DMAc polar solvent by a two-step process involving the formation of the polyamic acid followed by a solution chemical imidization process. Acetic acid was used as the dehydrating reagent and pyridine was used as the imidization catalyst for the solution chemical imidization reaction.

For example, a dry 2 L three-necked round-bottom flask attached to a mechanical stirrer and a reflux condenser with a nitrogen inlet was charged with TMPDA (30.0 g, 1.00 equiv), TMMDA (50.8 g, 1.00 equiv), and anhydrous DMAc (775 g) and the solution was vigorously stirred. The dianhydride PMDA (89.8 g, 2.00 equiv) was added. Additional DMAc (130 g) was added slowly. The reaction was sealed with a septum and stirred at 22° C. for 20 hours. Acetic anhydride (86.4 g) was added to the viscous reaction mixture slowly over 5 minutes, followed by pyridine (133 g) all at once. The reaction is heated to 95° C. for 2.5 hours and then allowed to cool to room temperature. The reaction mixture precipitated into a solution of isopropanol:acetone (1:1) to form white thin fibers. The white solid was heated in the vacuum oven for two days at 100° C. The polymer was isolated in nearly quantitative yield.

Example 3

Preparation of Poly(PMDA-TMPDA-TMMDA) Polyimide Polymer Membranes

The polyimide membrane dense films were prepared as follows: The aromatic poly(PMDA-TMPDA-TMMDA) polyimide, was dissolved in N-methyl pyrrolidone (NMP, 18% polymer). The polyimide dope was filtered, allowed to degas overnight and cast onto a clean glass plate with a doctor knife with a 20-mil knife gap. The film on the glass plate was heated to 60° C. for 6 hours and dried in the vacuum oven at 180° C. for 48 hours. The film was tested for $CO_2/CH_4$ and $H_2/CH_4$ separations at 50° C. under 689 kPa (100 psig) pure gas feed pressure. The films were also submitted to UV treatment at 254 nm at 2 cm for 10 minutes at 50° C. and subsequently tested again under pure gas pressures. The results are shown in Table 1.

TABLE 1

Pure gas permeation test results of poly(PMDA-TMPDA-TMMDA) membranes for $CO_2/CH_4$ and $H_2/CH_4$ separations[a]

| Membrane[b] | $P_{CO2}$ (Barrer) | $P_{H2}$ (Barrer) | $\alpha_{CO2/CH4}$ | $\alpha_{H2/CH4}$ |
|---|---|---|---|---|
| Polyimide-1 | 434.6 | 434.7 | 11.8 | 11.8 |
| Polyimide-1-UV 10 min | 114.6 | 342.8 | 33.7 | 100.8 |
| Polyimide-2 | 436.3 | 483.0 | 10.4 | 11.5 |
| Polyimide-2-UV 10 min | 117.7 | 365.0 | 45.3 | 140.4 |

[a] $P_{CO2}$, $P_{CH4}$, and $P_{H2}$ were tested at 50° C. and 690 kPa (100 psig);
1 Barrer = $10^{-10} cm^3(STP) \cdot cm/cm^2 \cdot sec \cdot cmHg$
[b] Polyimide 1: PMDA:TMPDA:TMMDA (3:2:1);
Polyimide 2: PMDA:TMPDA:TMMDA (2:1:1).

Example 4

Preparation of Poly(PMDA-TMPDA-TMMDA) Polyimide Thin-Film Composite (TFC) Membrane A 2 wt % Polyimide 1 polymer solution was prepared by dissolving 0.8 g of Polyimide 1 polymer synthesized in Example 1 in a solvent mixture consisting of 19.6 g of 1,2,3-trichloro-propane and 19.6 g of dichloromethane. The solution was filtered using a 1 micron-sized filter to remove any insoluble impurities and allowed to degas overnight. One drop of Polyimide 1 polymer solution was introduced to the surface of a pure water bath. The Polyimide 1 solution spread on the surface of water with simultaneous solvent evaporation to form a thin polymer film on the surface of water. The thin polymer film on the surface of water was then laminated onto the surface of a low selectivity, high permeance porous poly (ether sulfone) support membrane. The resulting TFC membrane was dried at 70° C. for 1 hour in a conventional oven.

Example 5

UV Treatment of Polyimide 1 TFC Membrane

The UV-treated TFC Polyimide 1 polymer membranes were prepared by submitting the membrane to a UV lamp from a certain distance and for a period of time selected based upon the separation properties sought. For example, one UV treated TFC Polyimide 1 membrane was prepared from TFC Polyimide 1 membrane obtained in Example 3 by exposure to UV radiation using 254 nm wavelength UV light generated from a UV lamp with 10 cm (3.94 inches) distance from the membrane surface to the UV lamp and an radiation time of 10 minutes. The surface of the Polyimide 1 layer of the TFC Polyimide 1 membrane was dip coated with a RTV615A/615B silicone rubber solution. The coated membrane was dried inside a hood at room temperature for 30 minutes and then dried at 70° C. for 1 hour in a conventional oven.

TABLE 2

Mixed gas permeation test results of Polyimide 1 TFC membranes for $CO_2/CH_4$

| Membrane | $P_{CO2}/L$ (GPU) | $\alpha_{CO2/CH4}$ |
|---|---|---|
| Polyimide 1-TFC | 178 | 7.0 |
| Polyimide 1-TFC-UV10 min-2%RTV | 13.4 | 15.8 |

Conditions: Tested at 50° C., 6895 kPa (1000 psig), 10% $CO_2$/90% $CH_4$;

$$1 \text{ GPU} = 1 \times 10^{-6} \frac{cm^3(STP)}{cm^2 \cdot s \cdot cmHg}$$

SPECIFIC EMBODIMENTS

While the following is described in conjunction with specific embodiments, it will be understood that this description is intended to illustrate and not limit the scope of the preceding description and the appended claims.

A first embodiment of the invention is a polyimide polymer having a formula

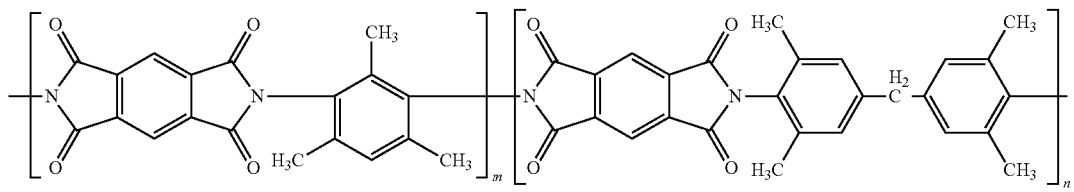

where m and n are independent integers from 10 to 500 and are in a ratio from 1:10 to 10:1. An embodiment of the invention is one, any or all of prior embodiments in this paragraph up through the first embodiment in this paragraph wherein the ratio of m to n is in a range from 1:5 to 5:1. An embodiment of the invention is one, any or all of prior embodiments in this paragraph up through the first embodiment in this paragraph wherein a polyimide membrane comprises a polyimide polymer having the above formula. An embodiment of the invention is one, any or all of prior embodiments in this paragraph up through the first embodiment in this paragraph wherein the polyimide polymer is UV treated.

A second embodiment of the invention is a process for separating at least one gas from a mixture of gases comprising providing a UV treated polyimide polymer membrane having a polyimide polymer with a formula

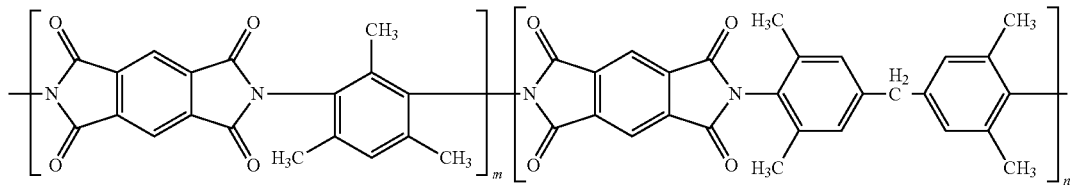

where m and n are independent integers from 10 to 500 and are in a ratio from 1:10 to 10:1; contacting the mixture of gases to one side of the UV treated polyimide polymer membrane to cause at least one gas to permeate the membrane; and removing from an opposite side of the UV treated polyimide polymer membrane a permeate gas composition comprising a portion of the at least one gas that permeated the membrane. An embodiment of the invention is one, any or all of prior embodiments in this paragraph up through the second embodiment in this paragraph wherein the mixture of gases comprises a mixture of carbon dioxide and methane. An embodiment of the invention is one, any or all of prior embodiments in this paragraph up through the second embodiment in this paragraph wherein the mixture of gases comprises a mixture of hydrogen and methane. An embodiment of the invention is one, any or all of prior embodiments in this paragraph up through the second embodiment in this paragraph wherein the mixture of gases comprises a mixture of helium and methane. An embodiment of the invention is one, any or all of prior embodiments in this paragraph up through the second embodiment in this paragraph wherein the mixture of gases comprises a mixture of at least one volatile organic compound and at least one atmospheric gas. An embodiment of the invention is one, any or all of prior embodiments in this paragraph up through the second embodiment in this paragraph wherein the mixture of gases comprises nitrogen and hydrogen. An embodiment of the invention is one, any or all of prior embodiments in this paragraph up through the second embodiment in this paragraph wherein the mixture of gases comprises a mixture of carbon dioxide, oxygen, nitrogen, water vapor, hydrogen sulfide, helium and methane. An embodiment of the invention is one, any or all of prior embodiments in this paragraph up through the second embodiment in this paragraph wherein the UV treated polyimide polymer membrane comprises a species that adsorbs strongly to at least one gas. An embodiment of the invention is one, any or all of prior embodiments in this paragraph up through the second embodiment in this paragraph wherein the mixture of gases comprises a mixture of paraffins and olefins.

A third embodiment of the invention is a method of preparing a polyimide polymer membrane comprising a condensation reaction of pyrometallic dianhydride (PMDA) with a mixture of 2,4,6-trimethyl-1,3-phenylenediamine (TMPDA) and 4,4'-methylene bis(2,6-dimethylaniline) (TMMDA) in a polar solvent to produce a polyimide polymer; then making a polyimide polymer membrane from the polyimide polymer and treating the polyimide polymer membrane with UV radiation. An embodiment of the invention is one, any or all of prior embodiments in this paragraph up through the third embodiment in this paragraph wherein the polar solvent comprises dimethylacetamide (DMAc) or N-methylpyrrolidone (NMP) solvent. An embodiment of the invention is one, any or all of prior embodiments in this paragraph up through the third embodiment in this paragraph wherein the condensation reaction is a two-step process involving a formation of a poly(amic acid) followed by a solution chemical imidization reaction. An embodiment of the invention is one, any or all of prior embodiments in this paragraph up through the third embodiment in this paragraph wherein acetic anhydride is used as a dehydrating agent and pyridine is used as an imidization catalyst for the solution chemical imidization reaction.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for separating at least one gas from a mixture of gases comprising providing a UV treated polyimide polymer membrane having a polyimide polymer with a formula

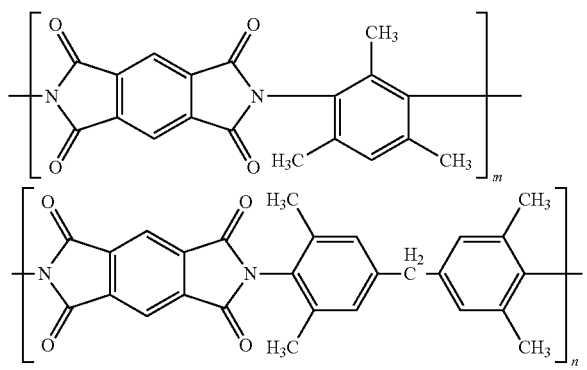

where m and n are independent integers from 10 to 500 and are in a ratio from 1:10 to 10:1; contacting the mixture of gases to one side of the UV treated polyimide polymer membrane to cause at least one gas to permeate said membrane; and removing from an opposite side of said UV treated polyimide polymer membrane a permeate gas composition comprising a portion of said at least one gas that permeated said membrane.

2. The process of claim 1 wherein said mixture of gases comprises a mixture of carbon dioxide and methane.

3. The process of claim 1 wherein said mixture of gases comprises a mixture of hydrogen and methane.

4. The process of claim 1 wherein said mixture of gases comprises a mixture of helium and methane.

5. The process of claim 1 wherein said mixture of gases comprises a mixture of at least one volatile organic compound and at least one atmospheric gas.

6. The process of claim 1 wherein said mixture of gases comprises nitrogen and hydrogen.

7. The process of claim 1 wherein said mixture of gases comprises a mixture of carbon dioxide, oxygen, nitrogen, water vapor, hydrogen sulfide, helium and methane.

8. The process of claim 1 wherein said UV treated polyimide polymer membrane comprises a species that adsorbs strongly to at least one gas.

9. The process of claim 1 wherein said mixture of gases comprises a mixture of paraffins and olefins.

* * * * *